US00RE48329E

(19) United States
(12) Reissued Patent
Walpurgis et al.

(10) Patent Number: US RE48,329 E
(45) Date of Reissued Patent: Dec. 1, 2020

(54) WATERCRAFT

(71) Applicant: CAYAGO TEC GmbH, Bad Salzuflen (DE)

(72) Inventors: Hans-Peter Walpurgis, Ellmau (AT); Oliver Schweizer, Stuttgart (DE)

(73) Assignee: CAYAGO TEC GmbH, Bad Salzuflen (DE)

(21) Appl. No.: 29/695,666

(22) Filed: Jun. 20, 2019

Related U.S. Patent Documents

Reissue of:
(64) Patent No.: Des. 789,867
Issued: Jun. 20, 2017
Appl. No.: 29/554,750
Filed: Feb. 15, 2016

(30) Foreign Application Priority Data

Aug. 17, 2015 (EM) ..... 002756064

(51) LOC (12) Cl. ..... 12-06
(52) U.S. Cl.
USPC ..... D12/308; D12/317
(58) Field of Classification Search
USPC ..... D12/300, 308, 317; D21/801, 810
(Continued)

(56) References Cited

U.S. PATENT DOCUMENTS

D242,615 S * 12/1976 Henning ..... D12/308
D323,808 S * 2/1992 DeSantis ..... D12/300
(Continued)

OTHER PUBLICATIONS

European Union Intellectual Property Office (EUIPO) Design No. 000284567-0001, registered Jan. 14, 2005, 5 pp.
(Continued)

*Primary Examiner* — Philip S Hyder
(74) *Attorney, Agent, or Firm* — Dentons US LLP

(57) CLAIM

What is claimed is the ornamental design for a watercraft, as shown and described.

DESCRIPTION

[FIG. 1 is an upper left front perspective view of the watercraft.]
[FIG. 2 is an upper left rear perspective view of the watercraft of FIG. 1.]
[FIG. 3 is a lower left front perspective view of the watercraft of FIG. 1.]
[FIG. 4 is a lower left rear perspective view of the watercraft of FIG. 1.]
[FIG. 5 is a top view of the watercraft of FIG. 1.]
[FIG. 6 is a left side view of the watercraft of FIG. 1, the right side being a mirror image thereof.]
[FIG. 7 is a bottom view of the watercraft of FIG. 1.]
[FIG. 8 is a rear view of the watercraft of FIG. 1; and,]
[FIG. 9 is a front view of the watercraft of FIG. 1.]
*FIG. 10 is an upper left front perspective view of the watercraft.*
*FIG. 11 is an upper left rear perspective view of the watercraft of FIG. 10.*
*FIG. 12 is a lower left front perspective view of the watercraft of FIG. 10.*
*FIG. 13 is a lower left rear perspective view of the watercraft of FIG. 10.*
*FIG. 14 is a top view of the watercraft of FIG. 10.*
*FIG. 15 is a left side view of the watercraft of FIG. 10, the right side being a mirror image thereof.*
*FIG. 16 is a bottom view of the watercraft of FIG. 10.*
*FIG. 17 is a rear view of the watercraft of FIG. 10; and,*
*FIG. 18 is a front view of the watercraft of FIG. 10.*
(Continued)

(NEW)

*The light gray ghosted regions in the figures are for illustrative purposes only and form no part of the claimed design.*

1 Claim, 8 Drawing Sheets

Matter enclosed in heavy brackets [ ] appears in the original patent but forms no part of this reissue; matter printed in italics indicates the additions made by reissue.

(58) Field of Classification Search
CPC ..... B63C 11/00; B63C 11/34; B63C 11/46; B63C 2011/028; A63B 35/00; A63B 35/08
See application file for complete search history.

(56) References Cited

U.S. PATENT DOCUMENTS 5,158,034 A * 10/1992 Hsu ..... B63C 11/46 114/315
5,634,423 A * 6/1997 Lashman ..... A63B 35/12 114/315
5,704,817 A * 1/1998 Vaughn ..... B63H 11/117 114/242
D471,506 S * 3/2003 Mah ..... D12/308
D506,176 S * 6/2005 Mah ..... D12/308
D507,776 S * 7/2005 Mah ..... D12/308
D518,768 S * 4/2006 Mah ..... D12/317
D549,636 S * 8/2007 Dial ..... D12/300
D572,702 S * 7/2008 Bart ..... D14/171
2004/0079272 A1* 4/2004 Mah ..... A63B 35/12 114/315
2015/0353175 A1* 12/2015 Walpurgis ..... A63B 35/12 114/315

OTHER PUBLICATIONS

European Union Intellectual Property Office (EUIPO) Design No. 002077206-0001, registered, Jul. 20, 2012, 6 pp.
European Union Intellectual Property Office (EUIPO) Design No. 002077206-0002, registered, Jul. 20, 2012, 11 pp.
European Union Intellectual Property Office (EUIPO) Design No. 002077206-0003, registered Jul. 20, 2012, 6 pp.
European Union Intellectual Property Office (EUIPO) Design No. 002077206-0004, registered Jul. 20, 2012, 11 pp.
European Union Intellectual Property Office (EUIPO) Design No. 002756064-0002, registered Aug. 17, 2015, 6 pp.
European Union Intellectual Property Office (EUIPO) Design No. 003832526-0001, published Mar. 31, 2017, 3 pp.
European Union Intellectual Property Office (EUIPO) Design No. 002077206-0001, published Sep. 10, 2012, 3 pages.
European Union Intellectual Property Office (EUIPO) Design No. 002077206-0002, published Sep. 10, 2012, 3 pages.
European Union Intellectual Property Office (EUIPO) Design No. 002077206-0003, published Sep. 10, 2012, 3 pages.
European Union Intellectual Property Office (EUIPO) Design No. 002077206-0004, published Sep. 10, 2012, 3 pages.

* cited by examiner

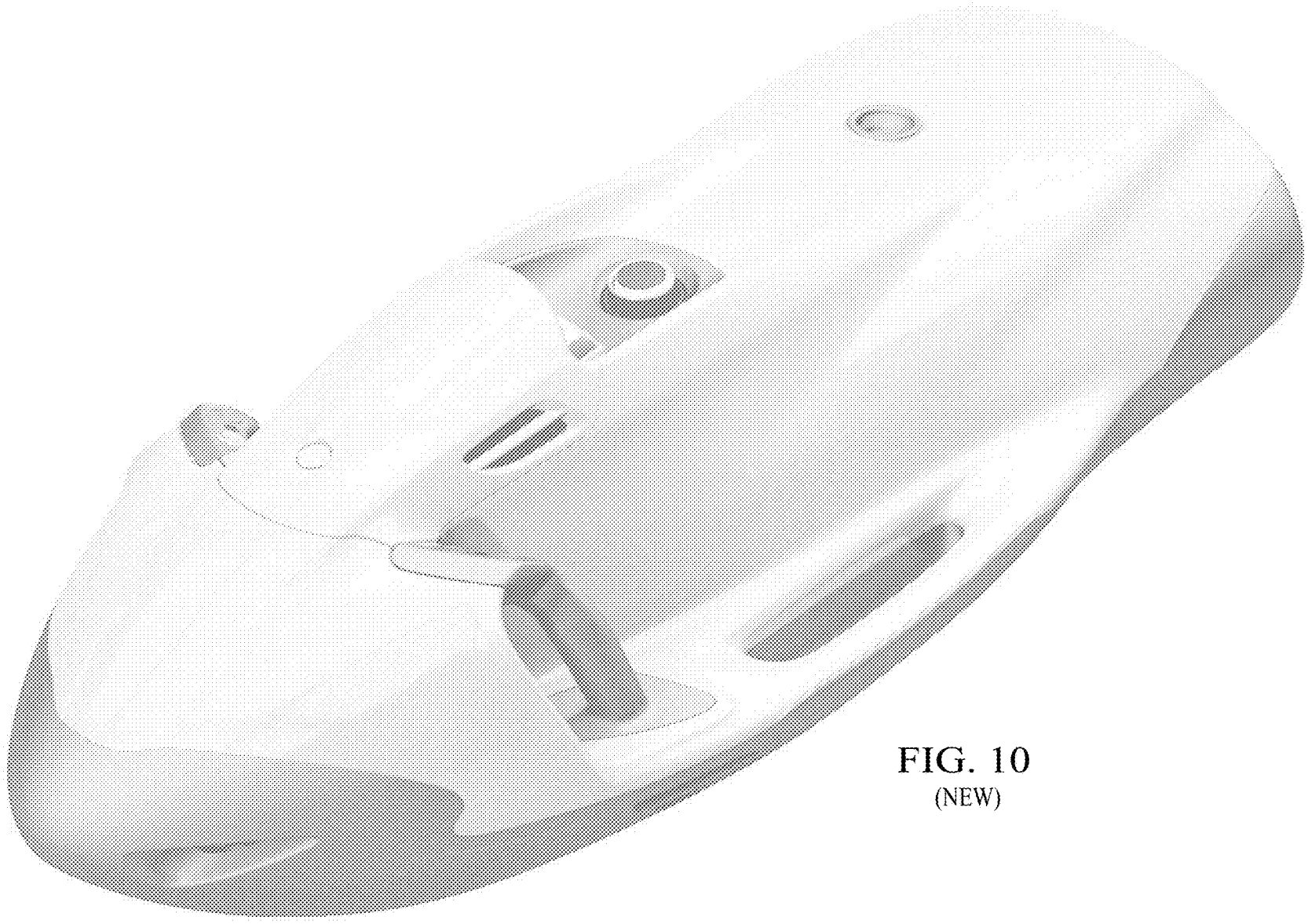
FIG. 10
(NEW)

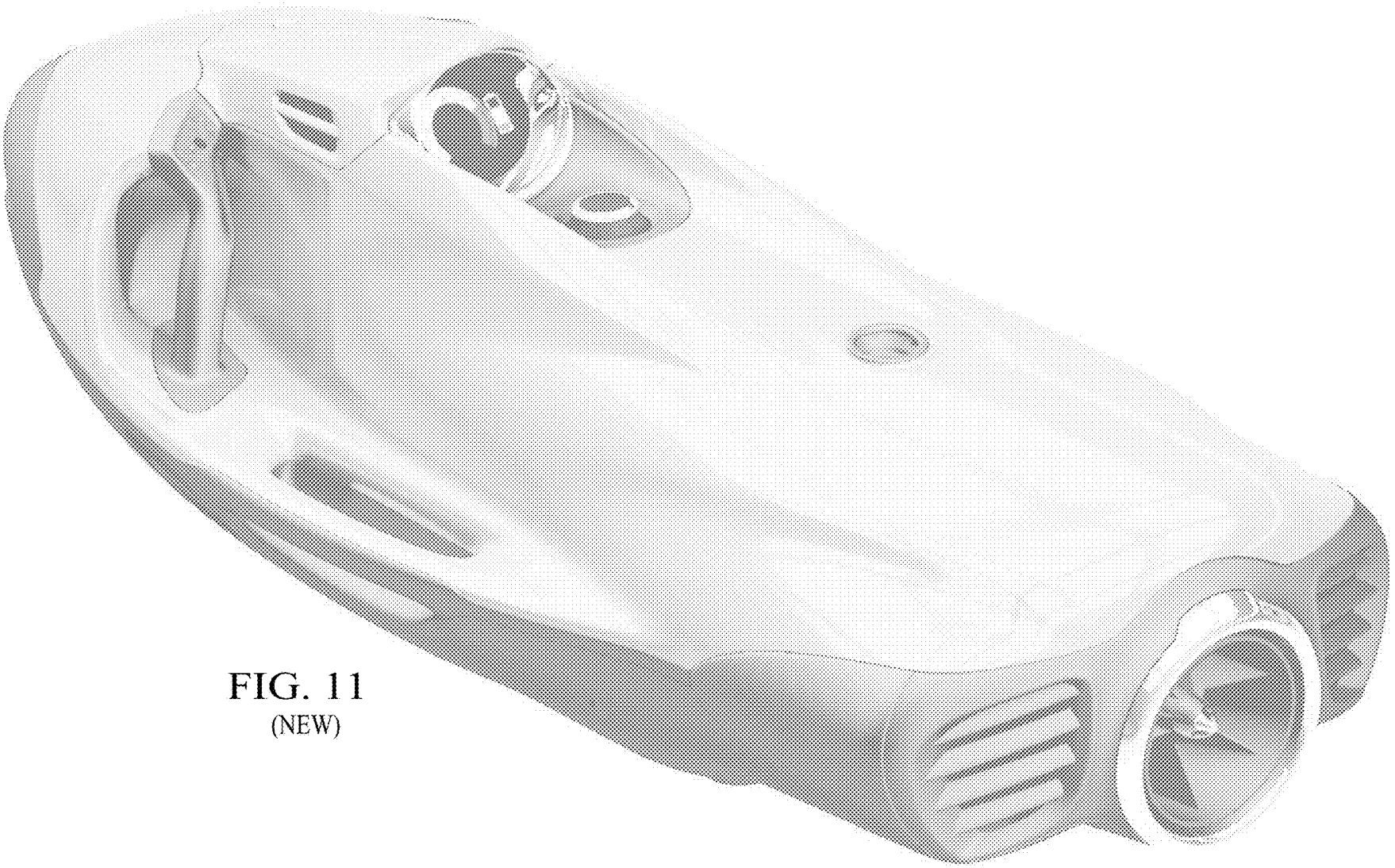
FIG. 11
(NEW)

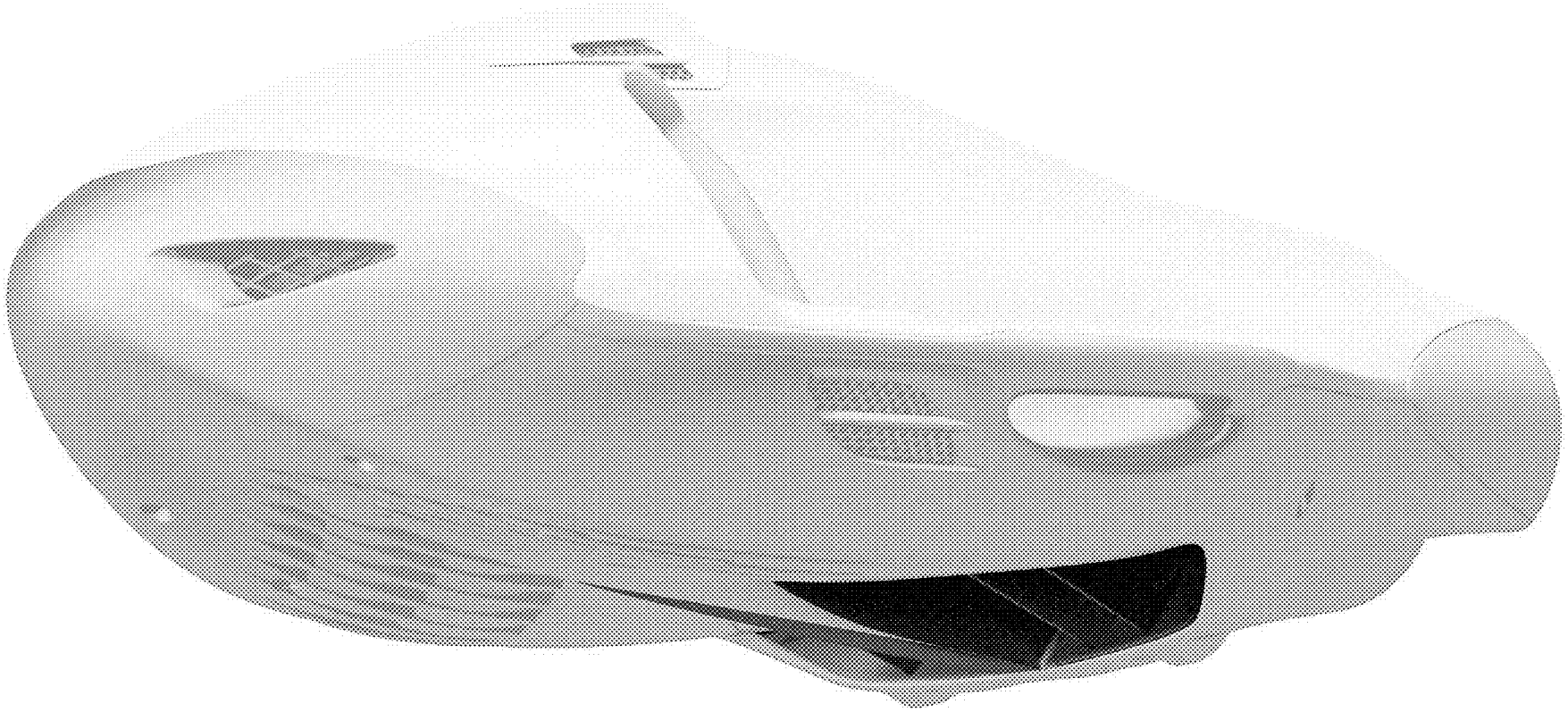
FIG. 12
(NEW)

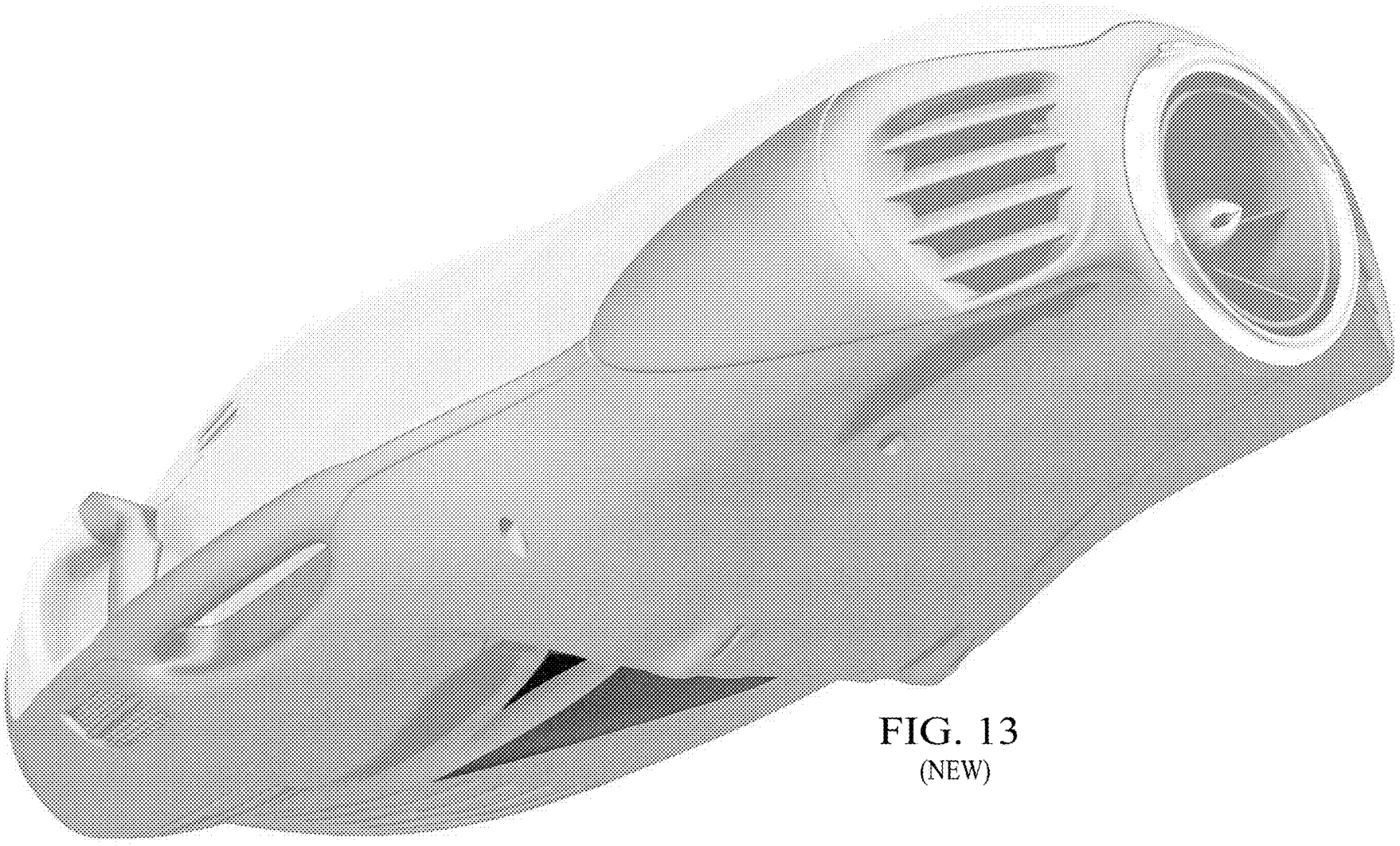
FIG. 13
(NEW)

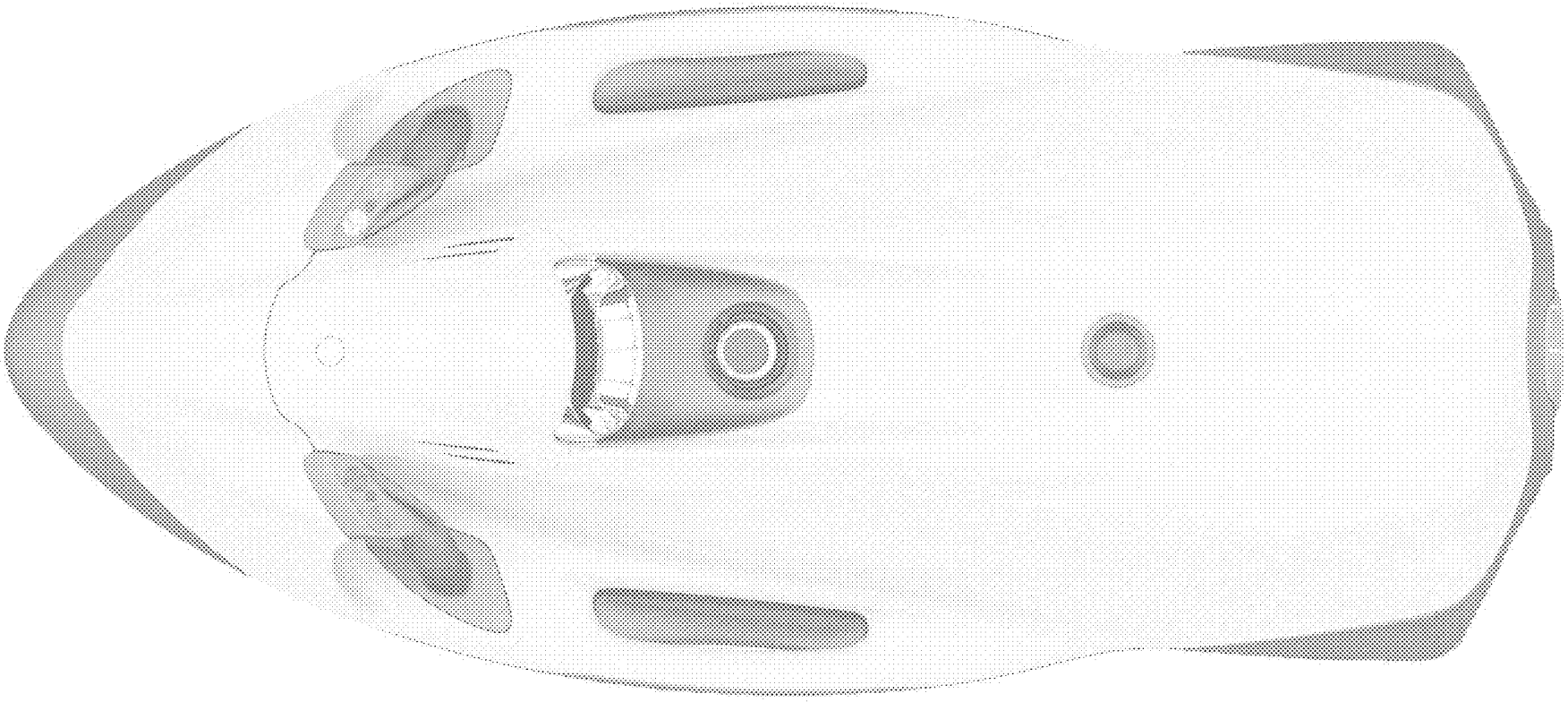
FIG. 14
(NEW)

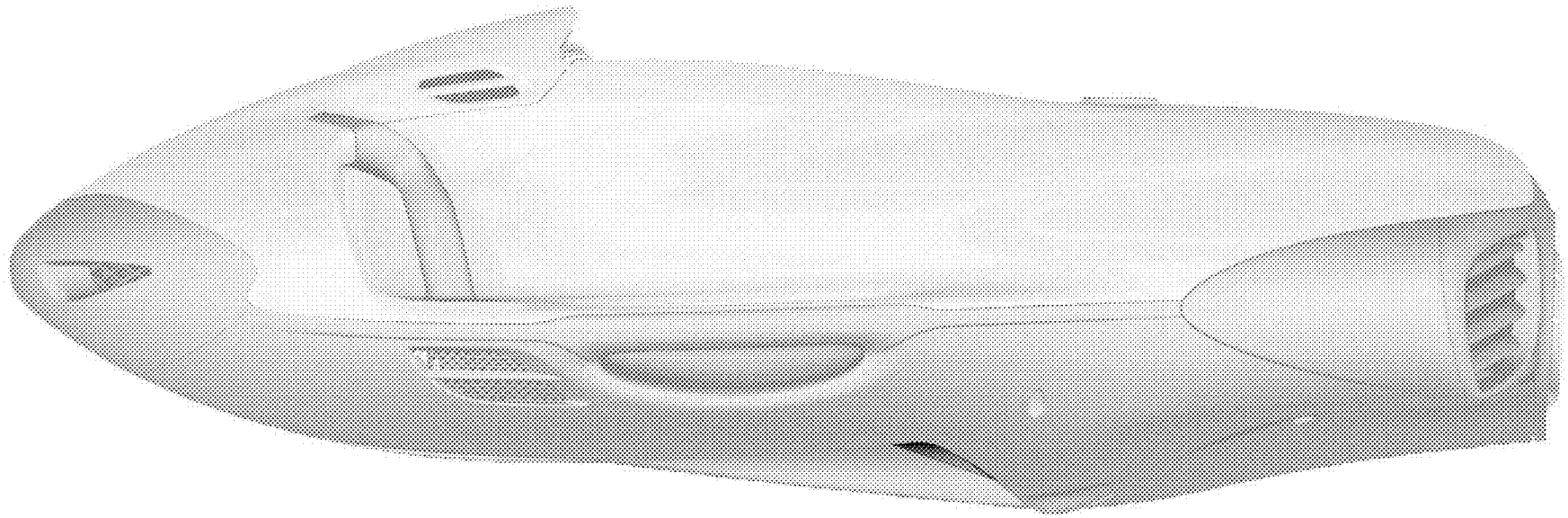
FIG. 15
(NEW)

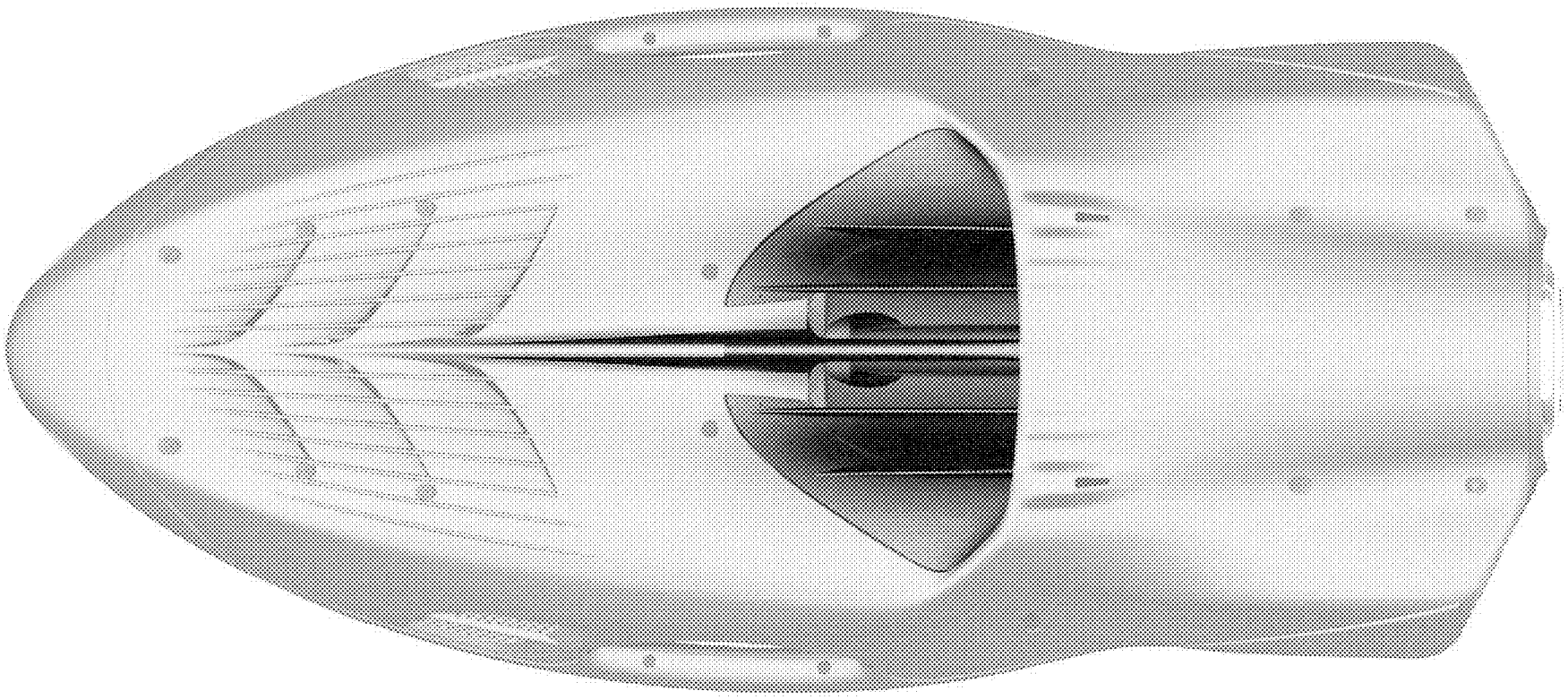
FIG. 16
(NEW)

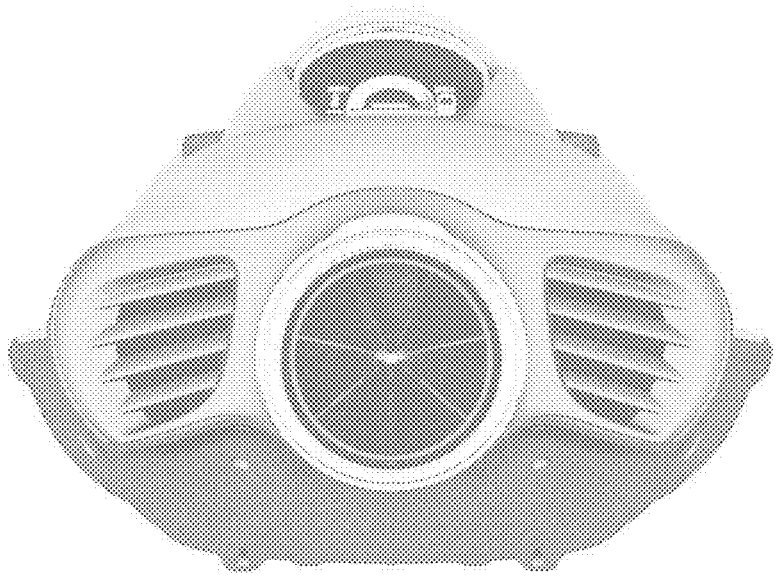
FIG. 17
(NEW)
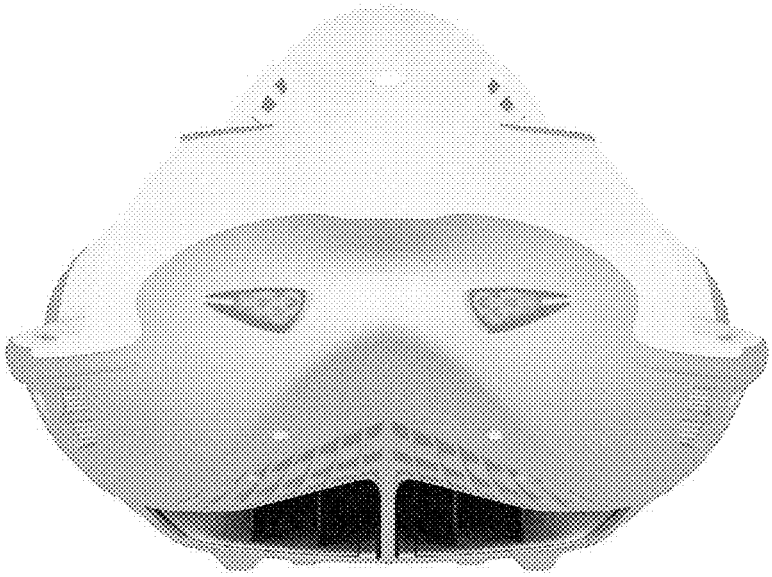
FIG. 18
(NEW)